United States Patent
Burch et al.

(10) Patent No.: US 8,065,395 B2
(45) Date of Patent: Nov. 22, 2011

(54) SYSTEM AND METHOD FOR QUEUING TO A CLOUD VIA A QUEUING PROXY

(75) Inventors: Lloyd Leon Burch, Payson, UT (US); Carolyn Bennion McClain, Springville, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 5 days.

(21) Appl. No.: 12/612,807

(22) Filed: Nov. 5, 2009

(65) Prior Publication Data
US 2010/0235887 A1 Sep. 16, 2010

Related U.S. Application Data

(60) Provisional application No. 61/160,014, filed on Mar. 13, 2009.

(51) Int. Cl.
- *G06F 15/16* (2006.01)
- *G06F 15/173* (2006.01)
- *G06F 15/177* (2006.01)

(52) U.S. Cl. ........ 709/219; 370/231; 370/237; 370/255; 370/401; 711/162; 711/170

(58) Field of Classification Search .......... 709/217–228; 370/401, 255, 231, 237; 711/162, 170
See application file for complete search history.

(56) References Cited

U.S. PATENT DOCUMENTS

| | | |
|---|---|---|
| 5,428,738 A | 6/1995 | Carter et al. |
| 5,787,175 A | 7/1998 | Carter |
| 5,870,564 A | 2/1999 | Jensen et al. |
| 5,878,419 A | 3/1999 | Carter |
| 6,067,572 A | 5/2000 | Jensen et al. |
| 6,108,619 A | 8/2000 | Carter et al. |
| 6,119,230 A | 9/2000 | Carter |
| 6,185,612 B1 | 2/2001 | Jensen et al. |
| 6,219,652 B1 | 4/2001 | Carter et al. |
| 6,275,819 B1 | 8/2001 | Carter |
| 6,405,199 B1 | 6/2002 | Carter et al. |
| 6,459,809 B1 | 10/2002 | Jensen et al. |
| 6,601,171 B1 | 7/2003 | Carter et al. |
| 6,647,408 B1 | 11/2003 | Ricart et al. |
| 6,650,777 B1 | 11/2003 | Jensen et al. |
| 6,697,497 B1 | 2/2004 | Jensen et al. |
| 6,738,907 B1 | 5/2004 | Carter |
| 6,742,035 B1 | 5/2004 | Zayas et al. |
| 6,742,114 B1 | 5/2004 | Carter et al. |
| 6,760,843 B1 | 7/2004 | Carter |
| 6,772,214 B1 | 8/2004 | McClain et al. |

(Continued)

*Primary Examiner* — Haresh N Patel
(74) *Attorney, Agent, or Firm* — Haynes and Boone, LLP

(57) ABSTRACT

System and method for servicing queue requests via a proxy are described. In one embodiment, the system includes an enterprise queuing proxy ("EQP") disposed within an enterprise computing environment and having an enterprise queue associated therewith; a cloud queuing proxy ("CQP") disposed within a cloud computing environment, the CQP connected to a plurality of cloud queues each having associated therewith at least one queue service process listening on the cloud queue for queue requests to service; and a secure communications mechanism for interconnecting the EQP and the CQP. Upon receipt of a queue request from an enterprise service, the EQP evaluates the request against policy to determine whether to service it locally or remotely and, if the request is to be serviced remotely, forwards the request to the CQP via the secure communications mechanism. Upon receipt of the request, the CQP evaluates the queue request against policy to select one of the cloud queues to which to route the queue request for servicing.

16 Claims, 3 Drawing Sheets

U.S. PATENT DOCUMENTS

| | | |
|---|---|---|
| 6,826,557 B1 | 11/2004 | Carter et al. |
| 6,862,606 B1 | 3/2005 | Major et al. |
| 6,993,508 B1 | 1/2006 | Major et al. |
| 7,043,555 B1 | 5/2006 | McClain et al. |
| 7,152,031 B1 | 12/2006 | Jensen et al. |
| 7,177,922 B1 | 2/2007 | Carter et al. |
| 7,185,047 B1 | 2/2007 | Bate et al. |
| 7,197,451 B1 | 3/2007 | Carter et al. |
| 7,286,977 B1 | 10/2007 | Carter et al. |
| 7,299,493 B1 | 11/2007 | Burch et al. |
| 7,316,027 B2 | 1/2008 | Burch et al. |
| 7,334,257 B1 | 2/2008 | Ebrahimi et al. |
| 7,356,819 B1 | 4/2008 | Ricart et al. |
| 7,363,577 B2 | 4/2008 | Kinser et al. |
| 7,376,134 B2 | 5/2008 | Carter et al. |
| 7,386,514 B2 | 6/2008 | Major et al. |
| 7,389,225 B1 | 6/2008 | Jensen et al. |
| 7,426,516 B1 | 9/2008 | Ackerman et al. |
| 7,467,415 B2 | 12/2008 | Carter |
| 7,475,008 B2 | 1/2009 | Jensen et al. |
| 7,505,972 B1 | 3/2009 | Wootten et al. |
| 7,506,055 B2 | 3/2009 | McClain et al. |
| 7,552,468 B2 | 6/2009 | Burch et al. |
| 7,562,011 B2 | 7/2009 | Carter et al. |
| 2009/0157419 A1* | 6/2009 | Bursey .................. 705/1 |
| 2009/0248693 A1* | 10/2009 | Sagar et al. ............ 707/10 |
| 2010/0027552 A1* | 2/2010 | Hill ...................... 370/401 |
| 2010/0100718 A1* | 4/2010 | Srinivasan ............. 713/1 |
| 2010/0205395 A1* | 8/2010 | Srinivasan ............. 711/170 |
| 2010/0223397 A1* | 9/2010 | Elzur .................... 709/235 |
| 2010/0246443 A1* | 9/2010 | Cohn et al. ............ 370/255 |
| 2010/0262794 A1* | 10/2010 | De Beer et al. ........ 711/162 |

* cited by examiner

SYSTEM AND METHOD FOR QUEUING TO A CLOUD VIA A QUEUING PROXY

PRIORITY DATA

This application claims priority to U.S. Provisional Application Ser. No. 61/160,014 filed on Mar. 13, 2009, entitled "SYSTEM AND METHOD FOR QUEUING TO A CLOUD VIA A QUEUING PROXY," the disclosure of which is incorporated herein by reference in its entirety.

CROSS-REFERENCE TO RELATED APPLICATIONS

This application is related to the following commonly-assigned, co-pending applications, each of which is also incorporated herein by reference in its entirety:
1. U.S. patent application Ser. No. 12/612,818, now co-pending;
2. U.S. patent application Ser. No. 12/612,834, now co-pending;
3. U.S. patent application Ser. No. 12/612,841, now co-pending;
4. U.S. patent application Ser. No. 12/612,882, now co-pending;
5. U.S. patent application Ser. No. 12/612,895, now co-pending;
6. U.S. patent application Ser. No. 12/612,903, now co-pending;
7. U.S. patent application Ser. No. 12/612,925, now co-pending;
8. U.S. patent application Ser. No. 12/613,077, now co-pending;
9. U.S. patent application Ser. No. 12/613,098, now co-pending;
10. U.S. patent application Ser. No. 12/613,112, now co-pending; and
11. U.S. patent application Ser. No. 12/197,833, now co-pending.

BACKGROUND

Cloud computing is a type of computing in which dynamically scalable and typically virtualized resources are provided as services via the Internet. As a result, users need not, and typically do not, possess knowledge of, expertise in, or control over the technology and/or infrastructure implemented in the cloud. Cloud computing generally incorporates infrastructure as a service ("IaaS"), platform as a service ("PaaS"), and/or software as a service ("SaaS"). In a typical embodiment, cloud computing services provide common applications online, which applications are accessed using a web browser and the software and data for which are stored on servers comprising the cloud.

Cloud computing customers typically do not own or possess the physical infrastructure that hosts their software platform; rather, the infrastructure is leased in some manner from a third-party provider. Cloud computing customers can avoid capital expenditures by paying a provider only for what they use on a utility, or resources consumed, basis or a subscription, or time-based, basis, for example. Sharing computing power among multiple lessees has many advantages, including but not limited to improved utilization rates and an increase in overall computer usage.

As an increasing number of applications move to a cloud computing-based architecture, a queuing design is being employed more frequently. In a queuing design, single processes are broken down into small tasks. As a result, what was once a single process becomes several processes that can be executed independently of one another and that are linked together by a series of queues. When a process needs to use the services of another process, the process generates a "queue request," which is placed in a queue by the calling process and subsequently picked up and executed by a receiving process.

One example of the foregoing is a main program that provides a service for creating a Security Assertion Markup Language ("SAML") assertion in response to a login request. In this example, the main program would obtain the user's credentials, validate the user, check the rules and policies, build an SAML assertion, and reply to the requesting service. Currently, it would be extremely difficult if not impossible to accomplish the foregoing using remote processes, as the program would be required to have knowledge of all of the security, audit, and other policies, as well as the topology of the system itself.

Currently, it is extremely difficult to use remote processes that employ queues because all security, audit, and policy needs are required to be added to and understood by the application. Additionally, the topology of the system cannot be hidden from the application, making it more difficult to dynamically change the services provided thereby.

SUMMARY

In one embodiment, a system for servicing queue request via a proxy includes an enterprise queuing proxy ("EQP") disposed within an enterprise computing environment and having an enterprise queue associated therewith; a cloud queuing proxy ("CQP") disposed within a cloud computing environment, the CQP connected to a plurality of cloud queues each having associated therewith at least one queue service process listening on the cloud queue for queue requests to service; and a secure communications mechanism for interconnecting the EQP and the CQP. Upon receipt of a queue request from an enterprise service, the EQP evaluates the request against policy to determine whether to service it locally or remotely and, if the request is to be serviced remotely, forwards the request to the CQP via the secure communications mechanism. Upon receipt of the request, the CQP evaluates the queue request against policy to select one of the cloud queues to which to route the queue request for servicing.

DETAILED DESCRIPTION

Figure 1:
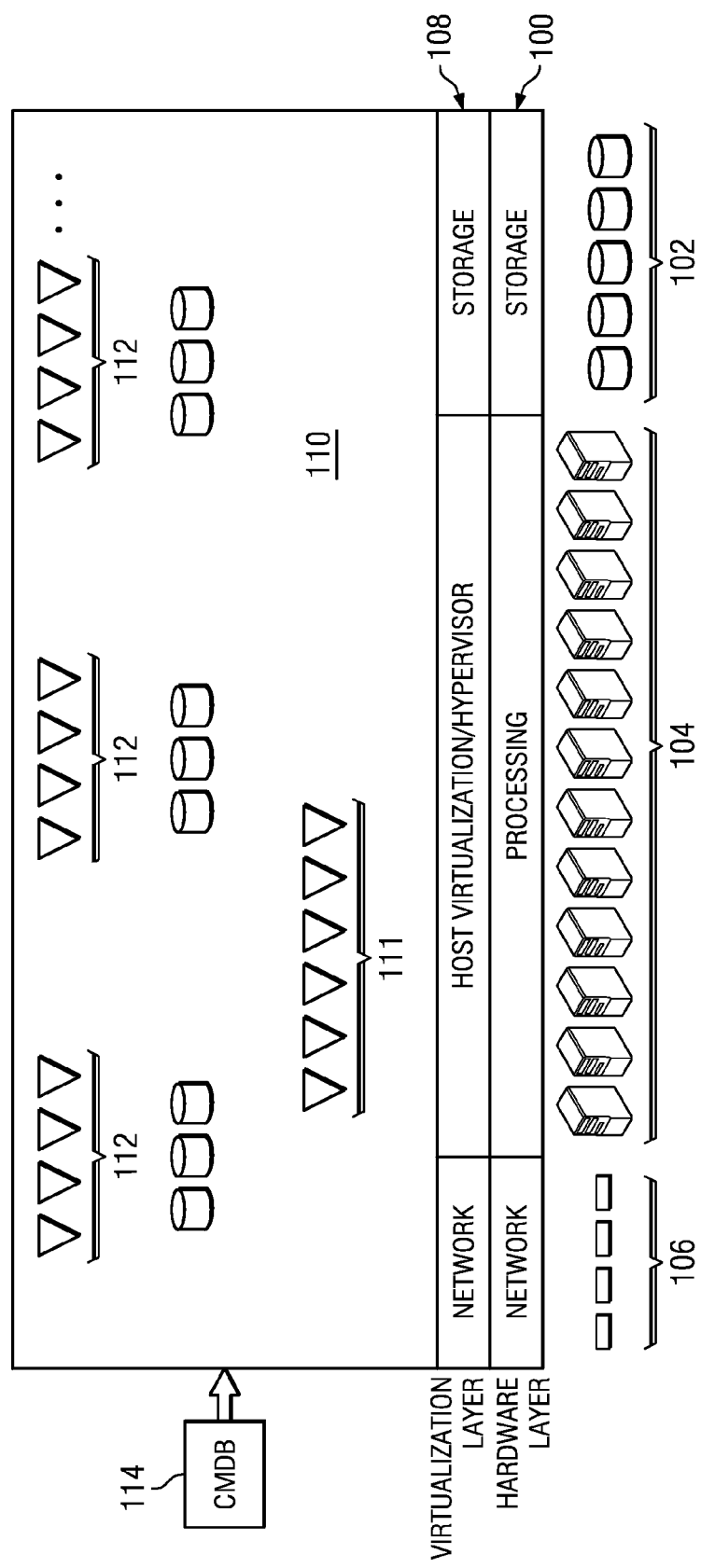
FIG. 1 illustrates an exemplary IaaS cloud structure such as may be implemented in one embodiment.

To better illustrate the advantages and features of the embodiments, a particular description of several embodiments will be provided with reference to the attached drawing. This drawing, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

As will be described in detail below, the embodiments described herein provide a "queuing proxy," which includes a local, or enterprise, portion and a remote, or cloud, portion. The local and remote portions of the queuing proxy are connected via a secure communications mechanism, which in one embodiment comprises a secure bridge that provides a veil with respect to remote communication and complexity. As a result, in the context of the SAML example presented above, the main process and SAML processes need not be aware of the location at which the other processes are executing. In particular, utilizing the embodiments described below, the information needed by the "build a SAML assertion" process is sent via a queue request. The receiving process is received and processed by the SAML process and then sent back via a queue to the main program, thus creating an isolation between the processes that allows the SAML process to scale differently than the main program. As a result, there may be one main program and 20 "build a SAML assertion" processes running.

As noted above, in one embodiment, security for the queuing proxy is handled via a secure bridge, as described in detail U.S. patent application Ser. No. 12/612,841, now co-pending, incorporated by reference above, such that processes can be queued from the enterprise to the cloud without the processes being aware of the details as to where (i.e., within the enterprise or within the cloud) the request is queued for processing.

Additionally, security is enforced without the knowledge of the calling or receiving processes and policy is enforced for both the calling and receiving processes via the queuing proxy. The queuing proxy may also provide an audit trail for the system and both the enterprise and cloud components can transparently share queues. Queues can be maintained locally when demand is low and can be dynamically scaled to use the cloud as needed when demand is high. Moreover, queues can be used by a cloud service to reach into the enterprise for necessary processes.

Referring once again to the SAML example presented in the Background section, in that scenario it may be beneficial for various reasons for the main program to execute within the enterprise, while the SAML processes execute in a cloud. This arrangement would allow the CPU-intensive SAML processes to take advantage of the "elastic computing" characteristics of the cloud computing environment. Without the benefit of the embodiments described herein, however, such an arrangement is not practical because the queues must be trusted or the security of the system will be low; moreover, if the sending processes must be aware of the locations of all of the receiving processes, the complexity of the system will be high and it will be difficult to manage such a large system with a common policy.

FIG. 1 illustrates an exemplary IaaS cloud structure. As shown in FIG. 1, the cloud structure includes a hardware layer 100 comprising storage assets 102, processing assets 104, and network assets 106. To facilitate usefulness of the cloud to a variety of enterprises, workloads are sponsored in the cloud as virtual machines possibly accessing virtualized storage and/or virtualized networks. This is accomplished via a virtualization layer 108. Thus, the hardware layer 100 is insulated from the actual workloads to be sponsored in the cloud at a layer 110 by the virtualization layer 108 hardware, storage, and networking so that the operating system selected by the enterprise can be sponsored on whatever hardware the cloud provider makes available. Having established the hardware and virtualization layers 100, 108, the assets 102, 104, and 106 are available in a standardized way to workloads hosted in the workload layer 110, which is the layer the customer typically views as the "cloud". It will be recognized that some of the workloads sponsored in the cloud, specifically, workloads 111, are workloads that are germane to the operation of the cloud and may consist of monitoring processes for enabling the cloud provider to monitor the health of the cloud, management processes to enable the cloud provider to ensure that service-level agreements are enforced, and so on.

Enterprises using the cloud are represented by virtualization processes and storage shown as workloads 112. These processes are typically started by an enterprise via a cloud portal or API utilized by administrative personnel or processes running at the enterprise or in the cloud. A typical cloud provider may be using standard ITIL practices and may utilize a configuration management database ("CMDB") 114, which affects the entire cloud infrastructure and which describes the practice and policies used for instantiating virtualized workloads and storage.

Figure 2:
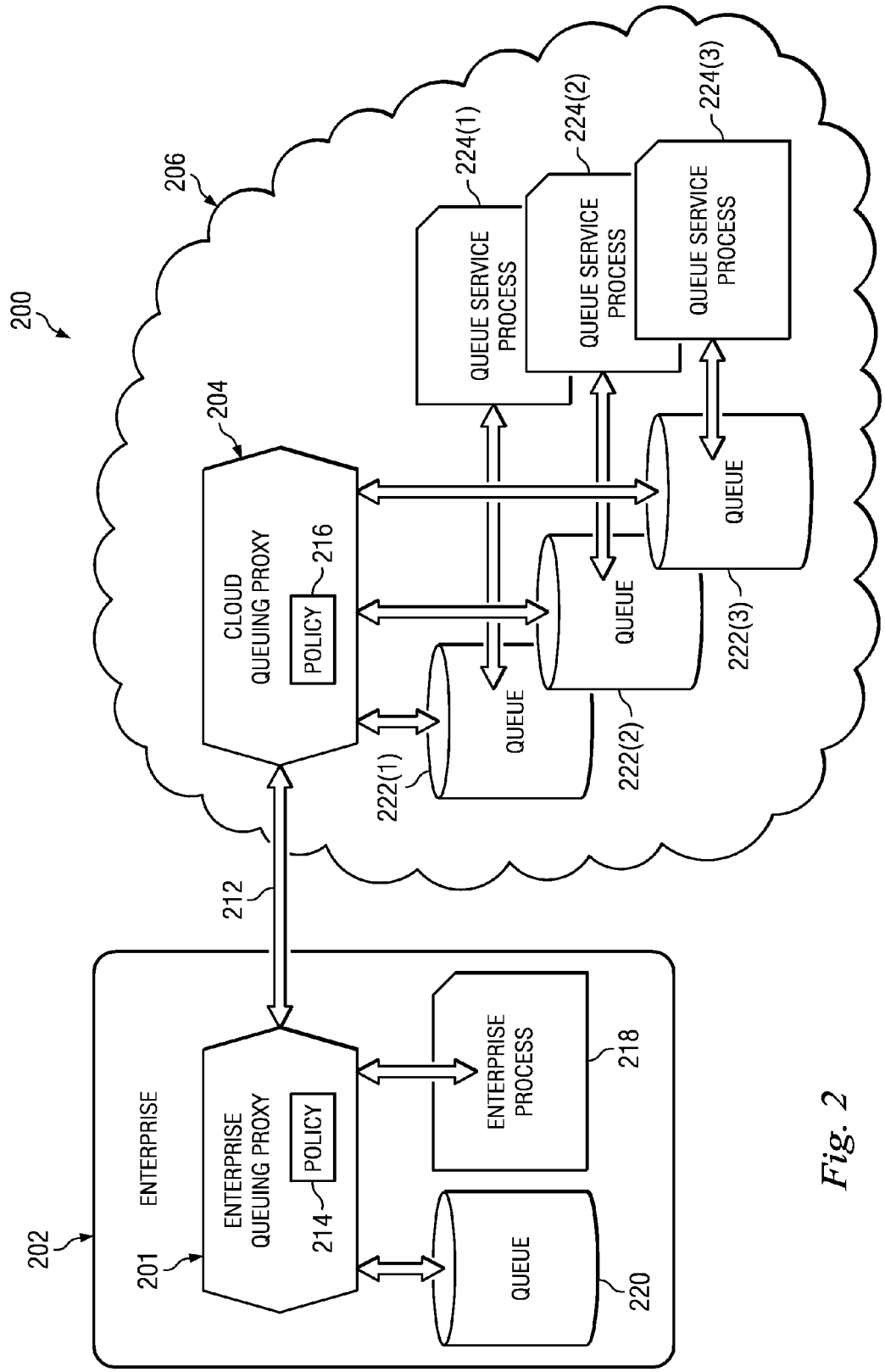
FIG. 2 illustrates a system for implementing a queuing proxy in accordance with one embodiment.

FIG. 2 illustrates a system 200 for implementing a queuing proxy in accordance with one embodiment. As shown in FIG. 2, a queuing proxy comprises two portions, including an Enterprise Queuing Proxy portion ("EQP") 201 associated with an enterprise 202, and a Cloud Queuing Proxy portion ("CQP") 204 associated with a cloud 206. The EQP 201 and CQP 204 are interconnected via a secure communications mechanism 212. In one embodiment, the secure communications mechanism 212 is implemented using a secure bridge as described in detail in the aforementioned U.S. patent application Ser. No. 12/612,841, now co-pending, previously incorporated by reference.

Each of the EQP 201 and the CQP 204 has associated therewith a policy engine 214, 216, respectively, for managing transmission and receipt of queue requests as will be described. Although the policy engines 214, 216, are illustrated in FIG. 2 as residing within the EQP 201, CQP 204, respectively, it will be recognized that such an arrangement is not required and that the policy engines may reside outside the respective queuing proxy. In one embodiment, when an enterprise process 218 needs to send a queue request, the queue request is sent to the EQP 201. Alternatively, the EQP 201 may, in its function as a proxy, intercept the request. Upon receipt of the queue request, the EQP 201 determines how to route the queue request in accordance with policy enforced by the policy engine 214. For example, the queue request may be routed such that it is handled locally by a local queue 220 or it may be routed to the CQP 204 to be handled by one of a plurality of cloud queues, represented by queues 222(1)-222(3). Each queue has associated therewith at least one listening queue service process 224(1)-224(3), respectively, for servicing the requests of the queue with which it is associated. This routing determination may be made based on system load, system performance, time, date, and/or any number of other factors dictated by the associated policy enforced by the policy engine 214.

Assuming that a decision is made to route the request to the CQP 204, the request is sent via the secure communications mechanism 212 to the CQP. It will be recognized that, in an embodiment in which the secure communications mechanism 212 is implemented using the secure bridge referred to above, the secure bridge will handle the security and the authentication of the transfer, as described in detail in the aforementioned U.S. patent application Ser. No. 12/612,841, now co-pending. Upon receipt of the request by the CQP 204, the request is evaluated against policy enforced by the policy engine 216 and, if the queue request is OK, the request is placed in a selected one of the cloud queues 222(1)-222(3) and serviced by the queue service process 224(1)-224(3) associated therewith. It will be recognized that there may be more than one queue service process associated with each queue 222(1)-222(3), thereby enabling a single process of the enterprise 202 to have at its disposal hundreds of processes in the cloud 206 performing work on its behalf. After the queue service process is finished processing the request from the cloud queue, the process is reversed and a response to the request is returned to the enterprise 202 via secure communications mechanism 212. The enterprise process 218 listens for the response and processes it.

Figure 3:
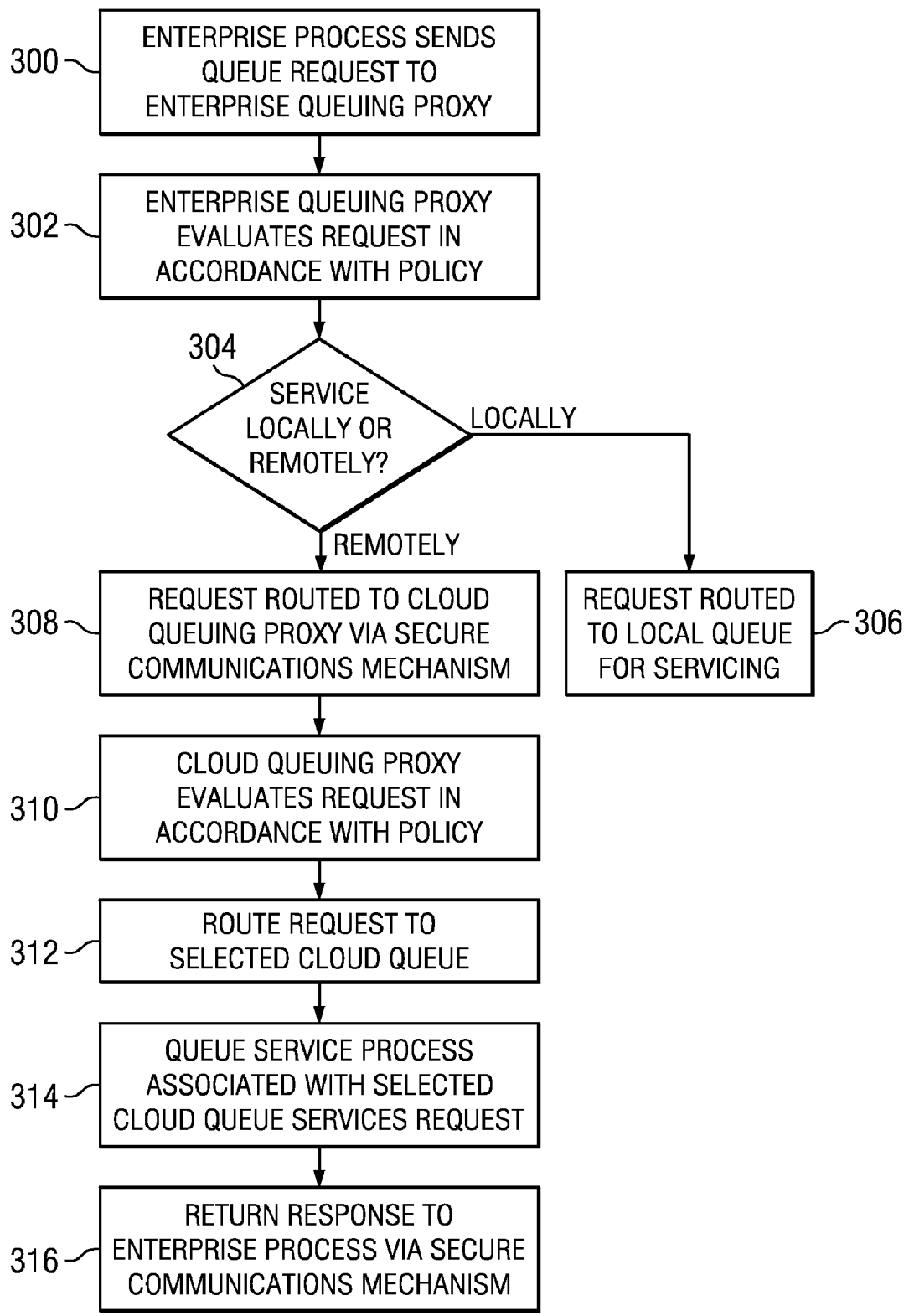
FIG. 3 is a flowchart of a method for implementing a queuing proxy in accordance with one embodiment.

FIG. 3 is a flowchart of a method that may be implemented by a system such as that illustrated in FIG. 2. It will be recognized that the method is at least partially implemented as one or more applications or services that reside in at least one computer-accessible and executable medium and may be accessible via a network or other appropriate connection. In step 300, an enterprise process, such as the enterprise process 218, sends a queue request to an EQP, such as the EQP 201. In step 302, the EQP processes the queue request in accordance with policy enforced thereby. One purpose of the processing is to determine where to route the queue request for servicing, as shown in step 304. As previously noted, the determination of whether to service a request locally or remotely may be based on any number of different considerations, including but not limited to, system workload, system performance, time, and/or date.

If a determination is made to service the queue request locally, in step 306, the queue request is routed to a local queue, such as the queue 220, and processed in a manner that will be apparent to one of ordinary skill in the art. Conversely, if a determination is made to service the queue request remotely, that is, in the cloud, in step 308, the queue request is sent to a CQP, such as the CQP 204, via the secure communications mechanism.

In step 310, the CQP evaluates the queue request against policy enforced by the CQP. One purpose of such evaluating is to select one of several queues maintained by the cloud, such as the queues 222(1)-222(3), to which to route the queue request for servicing. In step 312, the CQP routes the queue request to a selected one of the cloud queues and in step 314, the queue request is serviced by a queue service process associated with the selected queue, resulting in a response to the queue request. In step 316, the response is returned to the enterprise process via the secure communications mechanism.

It will be noted that while the foregoing examples describe queuing from the enterprise to the cloud, the embodiments may also be used by a cloud service to reach into the enterprise to access necessary processes in the same manner as described herein. Advantages offered by the embodiments described herein enable process queuing without the process having to be aware of the details. Additionally, security is performed and policy is enforced without either the calling or receiving processes having to be aware of the details thereof. Moreover, the proxies can provide an audit trail for the system and both the enterprise and cloud environments can transparently share queues.

Using the secure bridge to handle secure delivery of the queue request as described herein allows policy to be used to control a secure link of a queue-based system. Additionally, a service request queue proxy, such as the EQP 201 and the CQP 204, separates the queue from the requesting and responding processes, such that the policy of the queue may be handled by the proxy and not the process or the queue itself. This further enables policy and audit processes to be handled at an enterprise and/or cloud level, making it much easier to manage large systems that must balance the needs of many competing requirements for resources. Finally, using the embodiments described herein, local queues can be mixed with remote (cloud) queues and managed without any code changes to the applications.

It should be noted that the secure bridge referenced herein and descried in the aforementioned patent application may be advantageously used in any situation in which two heterogeneous processing environments need to be viewed as a single security domain, including, for example, multiple data centers within a single enterprise and/or multiple enterprises. As a result, the secure bridge allows for various types of cooperative services to be performed among environments.

It will be recognized that various ones of the elements and/or modules described herein may be implemented using one or more general purpose computers or portions thereof executing software applications designed to perform the functions described or using one or more special purpose computers or portions thereof configured to perform the functions described. The software applications may comprise computer-executable instructions stored on computer-readable media. Additionally, repositories described herein may be implemented using databases or other appropriate storage media.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A system for servicing queue requests via a proxy, the system comprising:
    at least one hardware processor;
    an enterprise queuing proxy ("EQP") disposed within an enterprise computing environment and having an enterprise queue associated therewith;
    a cloud queuing proxy ("CQP") disposed within a cloud computing environment, the CQP connected to a plurality of cloud queues each having associated therewith at least one queue service process listening on the cloud queue for queue requests to service; and
    a secure communications mechanism for interconnecting the EQP and the CQP such that communications between the EQP and the CQP occur in a secure and transparent manner;
    wherein responsive to receipt by the EQP of a queue request from an enterprise service, the EQP evaluates the queue request against policy accessed by the EQP to determine whether to service the queue request locally or remotely;

wherein responsive to a determination to service the queue request remotely, the EQP sends the queue request to the CQP via the secure communications mechanism;

wherein responsive to receipt of the queue request by the CQP, the CQP evaluates the queue request against policy accessed by the CQP to select one of the cloud queues to which to route the queue request for servicing and forwards the queue request to the selected cloud queue.

2. The system of claim 1 wherein, subsequent to the forwarding of the queue request to the selected cloud queue, one of the queue service processes listening on the selected cloud queue services the request to generate a response.

3. The system of claim 2 wherein the response is returned to the enterprise process via the CQP, the secure communications mechanism, the EQP, and the enterprise queue.

4. The system of claim 3 wherein the enterprise process listens on the enterprise queue for return of the response from the cloud computing environment.

5. The system of claim 1 where the secure communications mechanism comprises a secure bridge for enforcing security and performing authentication of the queue request.

6. The system of claim 1 wherein the EQP accesses a policy engine for maintaining and enforcing policy for determining whether to service the queue request locally or remotely.

7. The system of claim 1 wherein the CQP accesses a policy engine for maintaining and enforcing policy related to selecting one of the cloud queues to which to route the queue request for servicing.

8. The system of claim 1 wherein the policy accessed by the EQP comprises at least one of system workload, system performance, time, and date.

9. A method for using a proxy to service queue requests, the method comprising:

receiving by a first queuing proxy ("first QP") a queue request from a process executing in a first computing environment;

subsequent to receipt of the queue request, determining by the first QP whether to process the queue request locally within the first computing environment or remotely within a second computing environment based on policy of the first computing environment;

responsive to a determination to process the queue request remotely, forwarding the queue request to a second queuing proxy ("second QP") of the second computing environment via a secure communications mechanism, the secure communications mechanism for enforcing security and performing authentication of the queue request;

subsequent to receipt of the queue request by the second QP, selecting by the second QP one of a plurality of queues to which to route the queue request for processing based on policy accessed by the second QP; and forwarding, by a hardware processor, the queue request to the selected queue;

wherein the first computing environment comprises one of an enterprise computing environment and a cloud computing environment and the second computing environment comprises the other one of a cloud computing environment and an enterprise computing environment.

10. The method of claim 9 further comprising:

subsequent to the forwarding the queue request to the selected queue, processing the queue request by a queue service process listening on the selected queue to generate a response; and returning the response to the process via the CQP, the secure communications mechanism, and the EQP.

11. The method of claim 9 wherein the secure communications mechanism comprises a secure bridge for enforcing security and performing authentication of the queue request.

12. The method of claim 9 wherein the policy of the enterprise computing environment concerns at least one of system workload, system performance, time, and date.

13. A system for queuing processing requests via proxy, the system comprising:

at least one hardware processor;

an first queuing proxy ("first QP") disposed within a first computing environment comprising one of an enterprise computing environment and a cloud computing environment;

a second queuing proxy ("second QP") disposed within a second computing environment comprising the other one of an enterprise computing environment and a cloud computing environment, the second QP connected to a plurality of queues each having associated therewith at least one queue service process listening on the queue for queue requests to service; and a secure communications mechanism for interconnecting the first and second QPs such that communications between the first and second QPs occur in a secure and transparent manner;

wherein responsive to receipt by the first QP of a queue request from a process executing in the first computing environment, the first QP evaluates the queue request against policy accessed by the first QP to determine whether to service the queue request locally or remotely;

wherein responsive to a determination to service the queue request remotely, the first QP sends the queue request to the second QP via the secure communications mechanism;

wherein upon receipt of the queue request, the second QP evaluates the queue request against policy accessed by the second QP to select one of the queues for servicing the queue request and forwards the queue request to the selected queue.

14. The system of claim 13 wherein, subsequent to the forwarding of the queue request to the selected queue, one of the queue service processes listening on the selected queue services the request to generate a response, wherein the response is returned to the requesting process via the first QP, the secure communications mechanism, and the second QP.

15. The system of claim 13 where the secure communications mechanism comprises a secure bridge for enforcing security and performing authentication of the queue request.

16. The system of claim 13 wherein the first QP accesses a policy engine for maintaining and enforcing policy for determining whether to service the queue request locally or remotely, the policy comprising at least one of system workload, system performance, time, and date and wherein the second QP accesses a policy engine for maintaining and enforcing policy related to selecting one of the queues to which to route the queue request for servicing.

* * * * *